US005376801A

United States Patent [19]

[11] Patent Number: 5,376,801

[45] Date of Patent: Dec. 27, 1994

Saotome et al.

[54] RADIATION FILM AND ENERGY SUBTRACTION PROCESSING METHOD USING THE SAME

[75] Inventors: Shigeru Saotome; Satoshi Arakawa, both of Kanagawa, Japan

[73] Assignee: Fuji Photo Film Co., Ltd., Kanagawa, Japan

[21] Appl. No.: 965,422

[22] Filed: Oct. 23, 1992

[30] Foreign Application Priority Data

Oct. 24, 1991 [JP] Japan .................................. 3-277617
Nov. 26, 1991 [JP] Japan .................................. 3-310673

[51] Int. Cl.5 .............................................. G03B 42/04

[52] U.S. Cl. ................................. 250/482.1; 378/185; 430/139

[58] Field of Search ............................... 378/185, 187; 250/475.2, 482.1; 430/139, 503

[56] References Cited

U.S. PATENT DOCUMENTS

| | | | |
|---|---|---|---|
| 4,029,963 | 6/1977 | Alvarez | 378/5 |
| 4,258,264 | 3/1981 | Kotera et al. . | |
| 4,276,473 | 6/1981 | Kato et al. . | |
| 4,315,318 | 2/1982 | Kato et al. . | |
| 4,387,428 | 6/1983 | Ishida et al. . | |
| 4,855,598 | 8/1989 | Ohgoda et al. . | |
| 4,857,446 | 8/1989 | Diehl et al. . | |
| 4,948,717 | 8/1990 | Diehl et al. . | |

OTHER PUBLICATIONS

*Research Disclosure,* Nov. 1979, pp. 633–634, No. 18720.

*Primary Examiner*—Craig E. Church
*Attorney, Agent, or Firm*—Sughrue, Mion, Zinn, Macpeak & Seas

[57] ABSTRACT

A radiation film comprises a substrate and emulsion layers overlaid on opposite surfaces of the substrate. The radiation film is sandwiched between two radiation intensifying screens having different radiation energy absorption characteristics. Each of the emulsion layers has a sensitivity corresponding to the emission spectrum of its adjacent radiation intensifying screen. The emulsion layers form different colors in the radiation film after the radiation film has been developed. A removable light blocking layer is located between the substrate and each of the emulsion layers. The radiation film enables two kinds of images to be recorded with different radiation energy characteristics on a single radiation film, such that the image quality may not become bad due to cross-over light.

8 Claims, 6 Drawing Sheets

RADIATION FILM AND ENERGY SUBTRACTION PROCESSING METHOD USING THE SAME

BACKGROUND OF THE INVENTION

1. Field of the Invention

This invention relates to a radiation film, which comprises a substrate and emulsion layers overlaid on opposite surfaces of the substrate and is used by being sandwiched between two radiation intensifying screens. This invention also relates to a combination of a radiation film and radiation intensifying screens. This invention additionally relates to a radiation image read-out method for reading out radiation images, which have been recorded on a radiation film. This invention further relates to an energy subtraction processing method for radiation images.

2. Description of the Prior Art

Operations for recording radiation images are carried out in various fields. For example, radiation images to be used for medical purposes are recorded as in X-ray image recording for medical diagnoses. Also, radiation images to be used for industrial purposes are recorded as in radiation image recording for non-destructive inspection of substances. During such operations for recording radiation images, radiation films, e.g., X-ray films, and radiation intensifying screens are utilized. Specifically, a radiation intensifying screen is superposed upon one surface of a radiation film in close contact therewith. Alternatively, radiation intensifying screens are superposed upon opposite surfaces of a radiation film in close contact therewith.

Basically, a radiation film is composed of a substrate and an emulsion layer overlaid on one surface of the substrate or emulsion layers overlaid on opposite surfaces of the substrate. The emulsion layer is composed of a binder and a silver halide dispersed in the binder.

Also, basically, a radiation intensifying screen is composed of a substrate and a phosphor layer overlaid on one surface of the substrate. The phosphor layer is composed of a binder and phosphor grains dispersed in the binder. The phosphor grains produce fluorescence having a high luminance when they are excited by radiation, such as X-rays. Therefore, the phosphor produces the fluorescence having a high luminance in accordance with the amount of radiation, which has passed through an object. The radiation film, which is superposed upon the surface of the phosphor layer of the radiation intensifying screen in close contact therewith, is also exposed to the fluorescence produced by the phosphor. Therefore, a sufficient exposure of the radiation film can be achieved with a comparatively small dose of radiation.

In order for the radiation dose to the object to be kept as low as possible, the sensitivity of the imaging medium system, which is composed of the radiation intensifying screen and the radiation film and is utilized during the operation for recording a radiation image, should be as high as possible. Also, it is desired that the image thus obtained has good image quality, such as sharpness and granularity.

For the purposes of recording a radiation image with a high sensitivity, a double-faced emulsion film, which is composed of a substrate and emulsion layers overlaid on opposite surfaces of the substrate, has heretofore been employed as the radiation film. Radiation intensifying screens (i.e., a front screen and a back screen) are located on opposite sides of the radiation film, and an imaging medium system (i.e., a screen-film system) is thereby formed.

As the double-faced emulsion films, a regular type of film and an orthochromatic type of film are well known. Both of the emulsion layers overlaid on opposite surfaces of the regular type of film have a wavelength sensitivity to the blue optical region of approximately 350 nm to approximately 480 nm. Both of the emulsion layers overlaid on opposite surfaces of the orthochromatic type of film have a sensitivity to the green optical region of approximately 350 nm to 570 nm. Therefore, in cases where the regular type of double-faced emulsion film is used, screens for intensifying the blue region are utilized in combination with the film. In cases where the orthochromatic type of double-faced emulsion film is used, screens for intensifying the green region are utilized in combination with the film.

The image obtained with the radiation film described above is primarily an uncolored variable density image. For the purposes of improving diagnostic efficiency and accuracy, or the like, a color radiograph, which expresses image information in pseudo colors, is often utilized. The color radiograph can be obtained with a direct process, in which a color film is combined with color intensifying screens (capable of emitting blue light, green light, and red light), or with an indirect process, in which different levels of density in the conventional monochromatic photograph are indicated by different colors. Such processes are described in, for example, Japanese Patent Publication No. 48(1973)-12676.

Also, when certain kinds of phosphors are exposed to radiation such as X-rays, $\alpha$-rays, $\beta$-rays, $\gamma$-rays, cathode rays, or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

In the diagnostic fields using radiation, or the like, energy subtraction processing is often carried out by using stimulable phosphor sheets. With energy subtraction processing, an image of a specific object is extracted from radiation images which have been stored on stimulable phosphor sheets. The extracted image is utilized for making various diagnoses, or the like.

Specifically, with energy subtraction processing, each of at least two stimulable phosphor sheets is exposed to one of at least two kinds of radiation, which have different energy distributions and have passed through an object constituted of bones and soft tissues, and radiation images of the object are thereby recorded on the stimulable phosphor sheets. Each of the stimulable phosphor sheets is thereafter exposed to stimulating rays, and each of the radiation images is photoelectrically detected and converted into a digital image signal made up of a series of image signal components representing each radiation image. The image signal components of the digital image signals thus obtained, which image signal components represent corresponding picture elements in the radiation images, are then subtracted from each other, and a difference signal is thereby obtained which represents the image of only the bones or only the soft tissues represented by the radiation images. A method for obtaining an energy subtraction image is disclosed in, for example, U.S. Pat. No. 4,855,598.

A method for obtaining an energy subtraction image by reading out X-ray images, which have been recorded on X-ray films, by using a film digitizer has also been proposed in, for example, Japanese Unexamined Patent Publication No. 59(1984)-83147.

An object, such as a human body, includes soft tissues and bones, which exhibit different radiation transmission characteristics for radiation having different energy distributions. Therefore, the energy distribution of radiation irradiated through the object is changed during the operations for recording radiation images, and images are thereby obtained which vary in contrast between the soft tissue patterns and the bone patterns. Energy subtraction processing is then carried out on the images, and an image representing only the soft tissue patterns or an image representing only the bone patterns is thereby obtained. Therefore, for the purposes of obtaining an image in which only the soft tissue patterns have been emphasized, or an image, in which only the bone patterns have been emphasized, it has heretofore been necessary to use two recording media, such as stimulable phosphor sheets or X-ray films.

Also, with energy subtraction processing described above, two images of an object are recorded on two recording media, and two kinds of image signals are obtained from the two recording media. A subtraction process is then carried out on the two kinds of image signals, and an image signal representing only a specific part of the object is thereby obtained. Therefore, when the subtraction process is carried out on the image signals, it is necessary to adjust the image signals such that the positions of the two images represented by the image signals may coincide with each other. Such adjustment is not easy to carry out. If the positions of the image signals do not coincide with each other during the subtraction process, the problems will occur in that an unsharp energy subtraction image is obtained.

Additionally, when a radiation image of an object is recorded on the radiation film having the emulsion layers overlaid on opposite surfaces, the fluorescence, which has been produced by a radiation intensifying screen located on the side outward from the radiation film, is directly absorbed by the adjacent emulsion layer of the radiation film. The fluorescence also passes through the adjacent emulsion layer (as cross-over light) and impinges upon the opposite emulsion layer. The cross-over light has a spread due to scattering during the passage through the emulsion layer, or the like. As a result, the problems occur in that the image quality of the radiation image obtained with the radiation film becomes bad (i.e., the radiation image becomes unsharp).

SUMMARY OF THE INVENTION

The primary object of the present invention is to provide a radiation film that enables two kinds of images to be recorded with different radiation energy characteristics on a single radiation film such that the image quality may not become bad due to cross-over light.

Another object of the present invention is to provide a combination of the aforesaid radiation film and radiation intensifying screens.

A further object of the present invention is to provide a radiation image read-out method for detecting image signals from the aforesaid radiation film, on which radiation images have been recorded.

A still further object of the present invention is to provide an energy subtraction processing method wherein adjustment of image positions need not be carried out, or can be carried out easily when an energy subtraction image is obtained from the image signals that have been detected from the aforesaid radiation film.

Another object of the present invention is to provide a screen-film system for energy subtraction processing, that enables an energy subtraction image to be obtained such that a read-out apparatus, such as a film digitizer, need not be used to detect image signals from a radiation film or radiation films and such that adjustment of image positions need not be carried out.

A further object of the present invention is to provide an energy subtraction processing method wherein the screen-film system for energy subtraction processing is utilized.

The present invention provides a first radiation film comprising a substrate and emulsion layers overlaid on opposite surfaces of the substrate, the radiation film being sandwiched between two radiation intensifying screens having different radiation energy absorption characteristics, wherein each of the emulsion layers has a sensitivity corresponding to an emission spectrum of the radiation intensifying screen adjacent to the emulsion layer, and the emulsion layers form different colors in the radiation film after the radiation film has been developed.

The present invention also provides a second radiation film, wherein the first radiation film in accordance with the present invention is modified such that a light blocking layer, which is removable, is located between the substrate and each of the emulsion layers.

The present invention additionally provides a first combination of radiation intensifying screens and a radiation film, comprising:

i) two radiation intensifying screens having different radiation energy absorption characteristics, and ii) a radiation film comprising a substrate and emulsion layers overlaid on opposite surfaces of the substrate, the radiation film being sandwiched between the two radiation intensifying screens, wherein each of the emulsion layers has a sensitivity corresponding to an emission spectrum of the radiation intensifying screen adjacent to the emulsion layer, and the emulsion layers form different colors in the radiation film after the radiation film has been developed.

The present invention further provides a second combination of radiation intensifying screens and a radiation film, wherein the first combination of radiation intensifying screens and a radiation film in accordance with the present invention is modified such that a removable light blocking layer is located between the substrate and each of the emulsion layers.

The present invention still further provides a first radiation image read-out method comprising the steps of:

i) exposing the first or second radiation film in accordance with the present invention or the radiation film of the first or second combination of radiation intensifying screens and a radiation film in accordance with the present invention, which radiation film has been developed and has radiation images recorded thereon in a first color and a second color, to a first light beam having wavelengths such that the first light beam is capable of being absorbed by the first color, the first color being formed by the emulsion layer, which is overlaid on one surface of the substrate, the second color being formed by the emulsion layer, which is overlaid on the opposite surface of the substrate, ii) photoelectrically detecting a first image signal from the first light beam once it has passed through the radiation film, iii) thereafter exposing the radiation film to a second light beam having wavelengths such that the second light beam is capable of being absorbed by the second color, and iv) photoelectrically detecting a second image signal from the second light beam, once it has passed through the radiation film.

The present invention also provides a second radiation image read-out method comprising the steps of:

i) exposing the first or second radiation film in accordance with the present invention or the radiation film of the first or second combination of radiation intensifying screens and a radiation film in accordance with the present invention, which radiation film has been developed and has radiation images recorded thereon in a first color and a second color, to light at least containing the first color and the second color, the first color being formed by the emulsion layer, is overlaid on one surface of the substrate, the second color being formed by the emulsion layer, is overlaid on the opposite surface of the substrate, and ii) photoelectrically detecting the light, after it has passed through the radiation film, as a first image signal and a second image signal, by using a first photoelectric detection means, having a sensitivity to light of wavelengths within the wavelength distribution range of the first color, and a second photoelectric detection means, having a sensitivity to light of wavelengths within the wavelength distribution range of the second color.

The present invention additionally provides a first energy subtraction processing method comprising the steps of:

i) obtaining the first image signal and the second image signal with the first or second radiation image read-out method in accordance with the present invention, each of the first image signal and the second image signal being made up of a series of image signal components representing each of the radiation images recorded in the first color and the second color, and ii) weighting the first image signal and the second image signal, and subtracting the image signal components of the weighted first image signal and the weighted second image signal, which image signal components represent corresponding picture elements in the radiation images, from each other, whereby a difference signal is obtained which represents an image of only a specific object represented by the radiation images.

The first radiation film in accordance with the present invention and the radiation film of the first combination of radiation intensifying screens and a radiation film in accordance with the present invention comprises the substrate and the emulsion layers overlaid on opposite surfaces of the substrate. The radiation film is sandwiched between two radiation intensifying screens having different radiation energy absorption characteristics. Also, each of the emulsion layers has a sensitivity corresponding to the emission spectrum of the radiation intensifying screen adjacent to the emulsion layer. The emulsion layers form different colors in the radiation film after the radiation film has been developed. Therefore, two kinds of images can be recorded on a single radiation film with two kinds of radiation having different energy levels. (For example, an image recorded with X-rays having a high energy level, e.g., 120 kVp, and an image recorded with X-rays having a low energy level, e.g., 60 kVp, can be obtained on a single radiation film.) Also, based on the colors of the images, it is possible to determine whether each of the images represents information formed with the X-rays having a high energy level, or information formed with the X-rays having a low energy level. Accordingly, radiation images that contain large amounts of information reflecting the radiation energy characteristics and are suitable for a diagnosis of an object, or the like, can be recorded on a single radiation film.

Also, as described above, two kinds of images can be obtained with different radiation energy levels on a single radiation film. Therefore, an energy subtraction image can be obtained from a single radiation film.

Additionally, the emission spectra of the fluorescence produced by the radiation intensifying screens, which are located on opposite sides outward from the radiation film, are different from each other. Further, the spectrum regions to which the emulsion layers adjacent respectively to their respective radiation intensifying screens are sensitive are different from each other. Therefore, the exposure of the radiation film to cross-over light can be kept small.

With the second radiation film in accordance with the present invention and the second combination of radiation intensifying screens and a radiation film in accordance with the present invention, the first radiation film in accordance with the present invention and the first combination of radiation intensifying screens and a radiation film in accordance with the present invention are modified such that a removable light blocking layer is located between the substrate and each of the emulsion layers. In this way, cross-over light can be eliminated almost completely. Also, the light blocking layers can be constituted such that they may be dissolved out during processes such as development, washing, and fixing. Accordingly, the two radiation images recorded on the radiation film can be viewed as a single, transmission type of radiation image.

With the first radiation image read-out method in accordance with the present invention, the first or second radiation film in accordance with the present invention or the radiation film of the first or second combination of radiation intensifying screens and a radiation film in accordance with the present invention, which radiation film has been developed and has radiation images recorded thereon in different colors, is exposed to two kinds of light beams, which are capable of being absorbed respectively by the different colors. In this manner, two image signals, each of which corresponds to one of the different colors, can be obtained. Therefore, the first radiation image read-out method in accordance with the present invention is suitable for reading out the radiation images from the radiation film in accordance with the present invention.

With the second radiation image read-out method in accordance with the present invention, the first or second radiation film in accordance with the present invention or the radiation film of the first or second combination of radiation intensifying screens and a radiation film in accordance with the present invention, which radiation film has been developed and has radiation images recorded thereon in the first color and the second color, is exposed to light at least containing the first color and the second color. The first photoelectric detection means, which has a sensitivity to the first color, and the second photoelectric detection means, which has a sensitivity to the second color, are provided. In this manner, two image signals, each of which corresponds to one of the different colors, can be obtained. Therefore, as in the first radiation image read-out method in accordance with the present invention, the second radiation image read-out method in accordance with the present invention is suitable for reading out the radiation images from the radiation film in accordance with the present invention.

With the first energy subtraction processing method in accordance with the present invention, operations for energy subtraction are carried out on two kinds of image signals, which have been detected from the radiation film in accordance with the present invention by using the first or second radiation image read-out method in accordance with the present invention. Therefore, from a single radiation film, an energy subtraction image can be obtained which has good image quality and which is free of adverse effects of a shift in position between two images during the operations and adverse effects of cross-over light.

Specifically, with the first energy subtraction processing method in accordance with the present invention, the adjustment of image positions during the operations for energy subtraction can be carried out more easily than with conventional energy subtraction processing methods. With the first radiation image read-out method in accordance with the present invention, the position of the radiation film may be determined accurately when the operations for reading out the radiation images from the radiation film by irradiating the first and second light beams are begun. In this manner, the adjustment of image positions during the operations for energy subtraction can be carried out approximately accurately. With the second radiation image read-out method in accordance with the present invention, the image read-out operation may be carried out so that it is clear which picture element is being read out by which photoelectric read-out means. In such cases, it becomes unnecessary to carry out the adjustment of image positions. Therefore, the energy subtraction image can be prevented from becoming unsharp due to a shift in position between the radiation images during the operations for energy subtraction.

The present invention further provides a first screen-film system for energy subtraction processing, comprising:

i) two radiation intensifying screens comprising a front screen and a back screen, respectively, and
ii) a radiation film comprising a substrate and emulsion layers overlaid on opposite surfaces of the substrate, the radiation film being sandwiched between the two radiation intensifying screens, wherein the emulsion layer overlaid on one surface of the substrate is a normal gradation emulsion layer, and the emulsion layer overlaid on the opposite surface of the substrate, is a reversal gradation emulsion layer.

The term "normal gradation" as used herein means gradation opposite in effect to the reversal gradation, and means that the density of an image on an X-ray film increases as the exposure amount becomes larger within a certain range of exposure amount.

The present invention still further provides a second screen-film system for energy subtraction processing, wherein the first screen-film system for energy subtraction processing in accordance with the present invention is modified such that the front screen is constituted of a phosphor that exhibits a higher absorption ratio of radiation having a low energy level to radiation having a high energy level than a phosphor constituting the back screen.

The present invention also provides a third screen-film system for energy subtraction processing, wherein the first or second screen-film system for energy subtraction processing in accordance with the present invention is modified such that a light blocking layer, that is removable and has a transmittance of 10% or less is located between the two emulsion layers.

The present invention additionally provides a fourth screen-film system for energy subtraction processing, comprising:

i) two radiation intensifying screens comprising a front screen and a back screen, respectively, and
ii) two radiation films, superposed one upon the other and sandwiched between the two radiation intensifying screens, wherein an emulsion layer overlaid on one of the two radiation films is a normal gradation emulsion layer, and an emulsion layer overlaid on the other radiation film is a reversal gradation emulsion layer.

The present invention further provides a fifth screen-film system for energy subtraction processing, wherein the fourth screen-film system for energy subtraction processing in accordance with the present invention is modified such that the front screen is constituted of a phosphor that exhibits a higher absorption ratio of radiation having a low energy level to radiation having a high energy level than a phosphor constituting the back screen.

The present invention still further provides a sixth screen-film system for energy subtraction processing, wherein the fourth or fifth screen-film system for energy subtraction processing in accordance with the present invention is modified such that a light blocking layer that is removable and has a transmittance of 10% or less is located between the emulsion layers of the two radiation films superposed one upon the other.

The present invention also provides a seventh screen-film system for energy subtraction processing, wherein the fourth, fifth, or sixth screen-film system for energy subtraction processing in accordance with the present invention is modified such that an energy converting panel is located between the two radiation films.

The present invention additionally provides an eighth screen-film system for energy subtraction processing, wherein one of the first to seventh screen-film systems for energy subtraction processing in accordance with the present invention is modified such that the emulsion layers have gradation changing approximately linearly within a desired region of a radiation exposure amount.

The present invention further provides a second energy subtraction processing method comprising the steps of:

i) exposing a screen-film system for energy subtraction processing to radiation, the screen-film system for energy subtraction processing comprising:
   a) two radiation intensifying screens of a front screen and a back screen, and
   b) two radiation films, which are superposed one upon the other and are sandwiched between the two radiation intensifying screens, radiation images of an object being thereby recorded as latent images on the two radiation films,
ii) carrying out a normal development on one of the two radiation films on which the radiation images of the object have been recorded as latent images,
iii) carrying out a reversal development on the other radiation film, and
iv) superposing the radiation film on which the normal development has been carried out, and the radiation film, on which the reversal development has been carried out, one upon the other.

The first screen-film system for energy subtraction processing in accordance with the present invention comprises two radiation intensifying screens comprising a front screen and a back screen, respectively, and a radiation film comprising a substrate and two emulsion layers overlaid on opposite surfaces of the substrate. The radiation film is sandwiched between the two radiation intensifying screens. The emulsion layer overlaid on one surface of the substrate is a normal gradation emulsion layer, and the emulsion layer overlaid on the opposite surface of the substrate is a reversal gradation emulsion layer. Therefore, an image may be recorded with radiation having a low energy level, e.g., 60 kVp, in the normal gradation emulsion layer, and an image may be recorded with radiation having a high energy level, e.g., 120 kVp, in the reversal gradation emulsion layer. The radiation film, on which the two kinds of radiation images have thus been recorded, is then developed to obtain visible images. In this manner, an image representing only a specific object, i.e., an energy subtraction image, can be obtained. Therefore, operations for reading out the radiation images from the radiation film and thereby obtaining image signals representing the radiation image need not be carried out, and the energy subtraction image can be obtained directly by viewing the radiation film after it has been developed. Specifically, instead of a subtraction process being carried out as in ordinary energy subtraction processing, the reversal image is added to the normal image so as to effect a subtraction of image density. The so-called "subtraction process" is thus enabled. Also, with the first screen-film system for energy subtraction processing in accordance with the present invention, the energy subtraction image can be obtained from a single radiation film, and therefore the energy subtraction image can be prevented from becoming unsharp due to a shift in position between radiation films.

The fourth screen-film system for energy subtraction processing in accordance with the present invention comprises two radiation films superposed one upon the other and sandwiched between the two radiation intensifying screens. The emulsion layer overlaid on one of the two radiation films is constituted of a normal gradation emulsion layer, and the emulsion layer overlaid on the other radiation film is constituted of a reversal gradation emulsion layer. An image may be recorded with radiation having a low energy level on the normal gradation radiation film, and an image may be recorded with radiation having a high energy level on the reversal gradation radiation film. The two radiation films may then be developed and superimposed one upon the other. When the two radiation films superimposed one upon the other are viewed an energy subtraction image can be obtained, as in cases where the aforesaid radiation film having the emulsion layers on opposite surfaces of the substrate is used. Also, with the fourth screen-film system for energy subtraction processing in accordance with the present invention, the energy subtraction image can be obtained by superimposing the two radiation films, and therefore the energy subtraction image can be prevented from becoming unsharp due to a shift in position between the radiation films.

With the second or fifth screen-film system for energy subtraction processing in accordance with the present invention, the front screen is constituted of the phosphor that exhibits a higher absorption ratio of radiation having a low energy level to radiation having a high energy level than the phosphor constituting the back screen. Therefore, low energy components of radiation can be absorbed efficiently.

With the third screen-film system for energy subtraction processing in accordance with the present invention, the light blocking layer that is removable and has a transmittance of 10% or less is located between the two emulsion layers overlaid on opposite surfaces of the substrate. Also, with the sixth screen-film system for energy subtraction processing in accordance with the present invention, the light blocking layer that is removable and has a transmittance of 10% or less is located between the emulsion layers of the two radiation films superimposed one upon the other. Therefore, with the third or sixth screen-film system for energy subtraction processing in accordance with the present invention, cross-over can be restricted to 10% or less and an energy subtraction image can be obtained which has good image quality and is free from adverse effects of cross-over light. Also, the light blocking layer can be constituted such that it may be dissolved out during processes such as development, washing, and fixing. Accordingly, the two radiation images recorded on the radiation film or on the two radiation films can be viewed as a single, transmission type of radiation image.

With the seventh screen-film system for energy subtraction processing in accordance with the present invention, the energy converting panel is located between the two radiation films. Therefore, an energy subtraction image can be obtained both with the so-called "two-shot energy subtraction processing," wherein the operation for recording a radiation image is carried out twice with two kinds of radiation having different energy levels, and with the so-called "one-shot energy subtraction processing," wherein two radiation images are recorded with a single, simultaneous exposure to radiation.

With the second energy subtraction processing method in accordance with the present invention, radiation images of an object are recorded on the two radiation films superimposed one upon the other and sandwiched between the two radiation intensifying screens. The normal development is carried out on one of the two radiation films on which the radiation images of the object have been recorded as latent images. The reversal development is carried out on the other radiation film. Therefore, an energy subtraction image can be obtained by superimposing the two radiation films that have been developed, one upon the other.

DESCRIPTION OF THE PREFERRED EMBODIMENTS

The present invention will hereinbelow be described in further detail with reference to the accompanying drawings.

Figure 1:
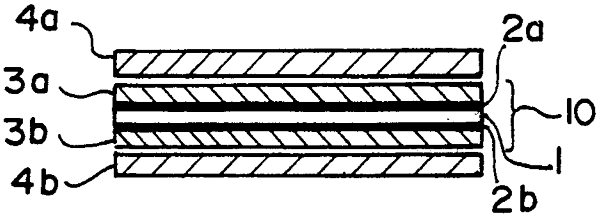
FIG. 1 is a sectional view showing an embodiment of the radiation film in accordance with the present invention.

FIG. 1 is a sectional view showing the fundamental structure of an X-ray film that serves as an embodiment of the radiation film in accordance with the present invention.

With reference to FIG. 1, an X-ray film 10 comprises a substrate 1, and emulsion layers 3*a* and 3*b*, which are overlaid on opposite surfaces of the substrate 1. Light blocking layers 2*a* and 2*b* intervene between the substrate 1 and the emulsion layers 3*a* and 3*b*. The X-ray film 10 is sandwiched between front screen 4*a* and back screen 4*b* that serve as radiation intensifying screens.

Basically, each of the radiation intensifying screens 4*a* and 4*b* comprises a substrate and a phosphor layer overlaid on the substrate. The front screen 4*a* and the back screen 4*b* have different radiation energy absorption characteristics. In this embodiment, by way of example, in cases where X-ray image recording is carried out, the front screen 4*a* should preferably be provided with a 100 $\mu$m-thick phosphor layer constituted of a phosphor represented by the formula $Y_2O_2S$:Tb. The phosphor exhibits the X-ray energy absorption characteristics indicated by curve A in FIG. 2 and is one of terbium activated rare earth element oxysulfide phosphors that exhibit a comparatively low radiation energy absorptivity and comparatively good characteristics of absorbing radiation having a low energy level, and which emit light of the green region. Also, the back screen 4*b* should preferably be provided with a 250 $\mu$m-thick phosphor layer constituted of a phosphor represented by the formula $Gd_2O_2S$:Tb, which exhibits the X-ray energy absorption characteristics indicated by curve B in FIG. 2, a comparatively high radiation energy absorptivity, and comparatively good characteristics of absorbing radiation having a high energy level. Also, a transparent protective film for protecting each phosphor layer may be overlaid on the surface of each phosphor layer on the side opposite to the substrate.

The substrate 1 may be constituted of a plastic film, such as a polyethylene terephthalate film. For the purposes of blocking cross-over light such that an image having good image quality may be obtained, the plastic film should preferably be colored with an appropriate coloring agent, such as a blue dye or a red dye.

The light blocking layers 2*a* and 2*b* are provided to block cross-over light such that an image having good image quality may be obtained. The light blocking layers 2*a* and 2*b* should preferably contain a filtering dye disclosed in, for example, Japanese Unexamined Patent Publication No. 63(1988)-197943 and which undergoes no migration between layers after the development process.

Each of the emulsion layers 3*a* and 3*b* is constituted of a binder, such as gelatin, and a silver halide dispersed in the binder. For example, a photographic emulsion layer that has a sensitivity to the blue region, i.e., a regular sensitivity, can be formed by applying a gelatin solution in which silver iodobromide (AgBrI) grains have been dispersed, onto a substrate and drying it. Also, for example, a photographic emulsion layer which has a sensitivity to the green region, i.e., an orthochromatic sensitivity, and a photographic emulsion layer which has a sensitivity to the red region, i.e., a panchromatic type of emulsion layer, can be formed with a composition containing silver iodobromide grains and a sensitizing dye, such as a red dye absorbed into the silver iodobromide gains.

Figure 3:
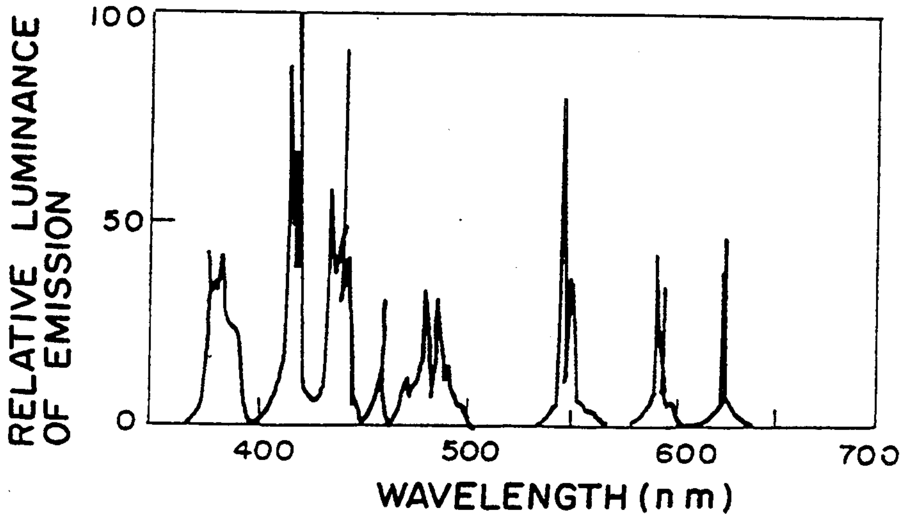
FIG. 3 is a graph showing an emission spectrum of $Y_2O_2S$:Tb.
Figure 4:
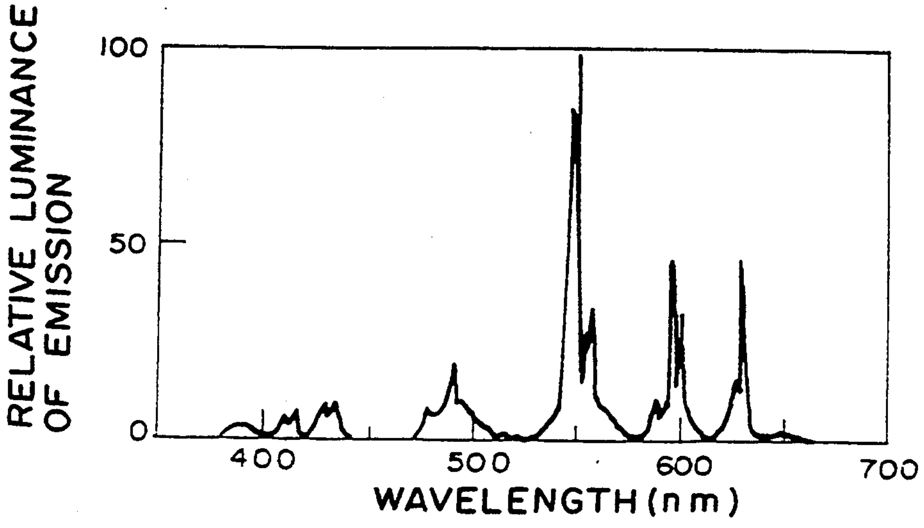
FIG. 4 is a graph showing an emission spectrum of $Gd_2O_2S$:Tb.

Each of the emulsion layers 3*a* and 3*b* of the X-ray film 10 in accordance with the present invention has a sensitivity to the emission spectrum of the radiation intensifying screen to which it is adjacent. The front screen 4*a* and the back screen 4*b* are the green (orthochromatic) intensifying screens and respectively have the emission spectra shown in FIGS. 3 and 4. Therefore, the emulsion layer 3*a* is constituted of an orthochromatic sensitivity emulsion layer having a sensitivity to the emission spectrum of the front screen 4*a*, which spectrum is shown in FIG. 3. Also, emulsion layer 3*b* is constituted of an orthochromatic sensitivity emulsion layer having a sensitivity to the emission spectrum of the back screen 4b, that spectrum is shown in FIG. 4. Additionally, after the X-ray film 10 is developed, the emulsion layers 3a and 3b form different colors in the X-ray film 10. In this embodiment, emulsion layer 3a forms yellow in the X-ray film 10, and emulsion layer 3b forms cyan in the X-ray film 10.

When the photographs on which different colors have been formed are viewed through, it is possible to discriminate, based on the colors, whether each of the images represents information formed with the X-rays having a high energy level or information formed with the X-rays having a low energy level. Accordingly, X-ray photographs that contain larger amounts of diagnostic information, or the like, than with conventional techniques, or the like, can be obtained.

How X-ray images of an object are recorded on the X-ray film 10 and an energy subtraction image is obtained from the X-ray images, will be described hereinbelow.

Figures 5, 6:
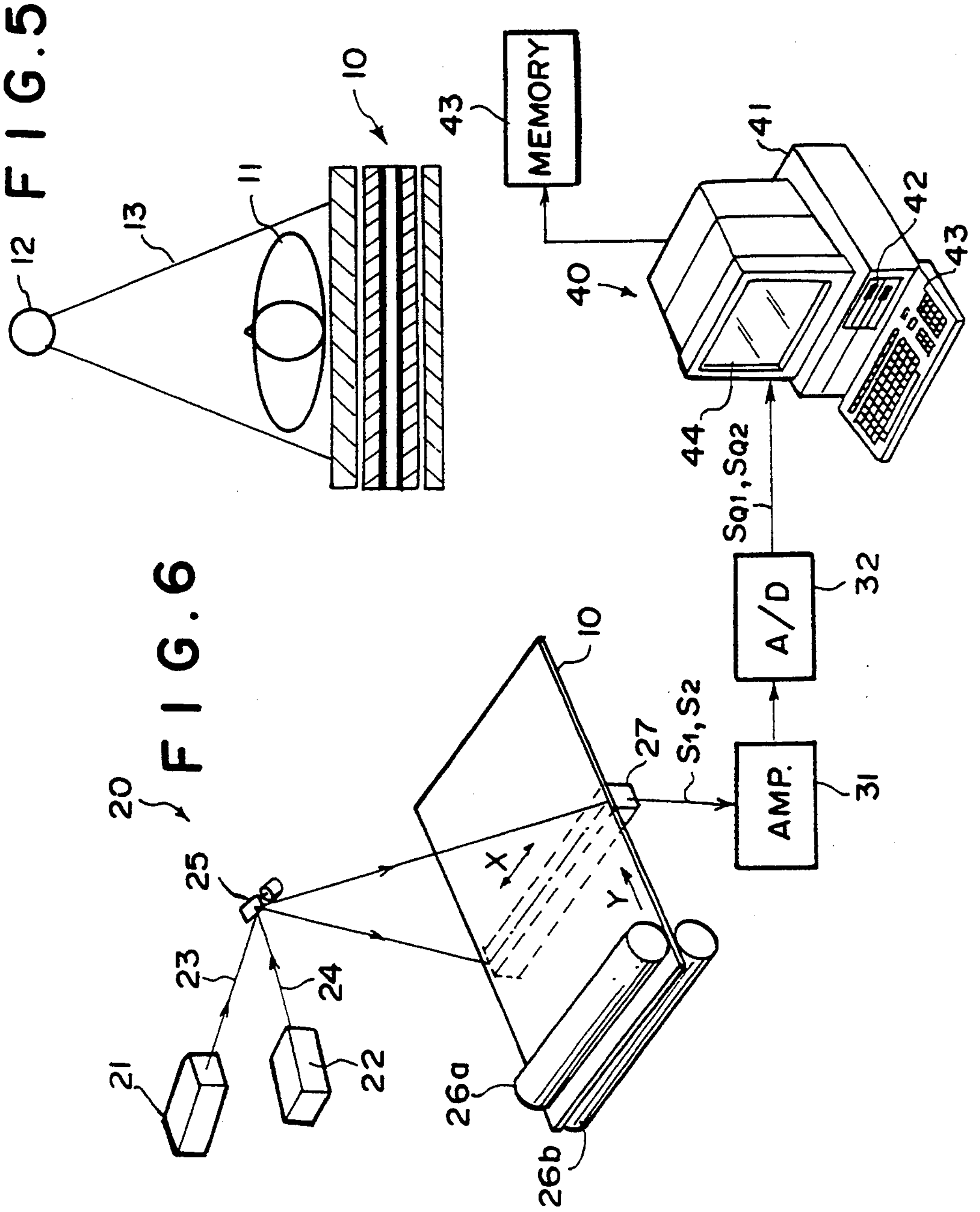
FIG. 5 is a schematic view showing how radiation images of an object are recorded on the embodiment of the radiation film in accordance with the present invention.
FIG. 6 is a schematic perspective view showing a radiation image read-out apparatus for carrying out an embodiment of the radiation image read-out method in accordance with the present invention.

FIG. 5 shows how an object 11 having soft tissues and bones is exposed to two kinds of X-rays 13, which have different energy levels and are produced by an X-ray source 12, and two kinds of X-ray images are recorded on the X-ray film 10. Specifically, first, the object 11 is exposed to the X-rays 13 having a low energy level (e.g., 60 kVp). The X-rays 13 pass through the object 11 and are then absorbed by the front screen 4a. The X-rays 13 are thus converted into the fluorescence having the emission spectrum shown in FIG. 3. The fluorescence impinges upon emulsion layer 3a of the X-ray film 10 that emulsion layer is adjacent to the front screen 4a. Thereafter, the tube voltage of the X-ray source 12 is changed, and the X-rays having a high energy level (e.g., 120 kVp) irradiate the object 11. As a result, the X-rays 13 pass through the object 11, the front screen 4a, emulsion layer 3a, the substrate 1, and emulsion layer 3b. Thereafter, the X-rays 13 are absorbed by the back screen 4b and converted into the fluorescence having the emission spectrum shown in FIG. 4. The fluorescence impinges upon emulsion layer 3b, which is adjacent to the back screen 4b.

Figure 2:
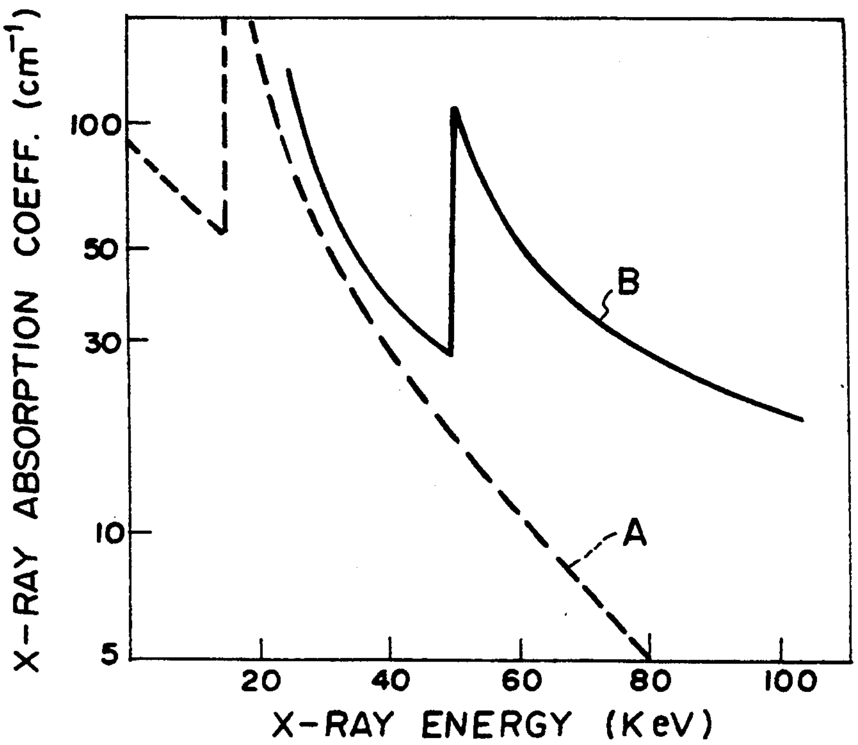
FIG. 2 is a graph showing the X-ray energy absorption characteristics of radiation intensifying screens.

As illustrated in FIG. 2, the X-ray energy absorption regions of the front screen 4a and the back screen 4b are not separated completely from each other. Also, in general, X-rays have a certain width of energy distribution. Therefore, when the X-rays 13 having the low energy level (e.g., 60 kVp) irradiate the object 11, the X-rays 13 that have passed through the front screen 4a are absorbed also by the back screen 4b. Also, when the X-rays 13 having the high energy level (e.g., 120 kVp) irradiate the object 11, some of the X-rays 13 that have passed through the front screen 4a are absorbed also by the front screen 4a. As illustrated in FIG. 2, the actual low-energy X-ray absorptivity of the back screen 4b is higher than the actual low-energy X-ray absorptivity of the front screen 4a. However, as is clear from FIG. 2, when two exposure operations are carried out in the manner described above, the ratio of the low energy components to the high energy components in the X-rays 13 absorbed by the front screen 4a is higher than the ratio of the low energy components to the high energy components in the X-rays 13 absorbed by the back screen 4b. Also, the proportion of the high energy components in the X-rays 13 absorbed by the back screen 4b, is higher than the proportion of the high energy components in the X-rays 13 absorbed by the front screen 4a. In this manner, by use of the two kinds of radiation intensifying screens having different radiation energy absorption characteristics, two kinds of the X-ray images are formed with different energy characteristics and expressed in different colors on opposite surfaces of a single X-ray film 10.

In the embodiment described above, the X-ray images of the object 11 are recorded on the X-ray film 10 with so-called "two-shot energy subtraction processing," wherein the operation for recording the X-ray image is carried out twice with two kinds of the X-rays having different energy levels. Alternatively, so-called "one-shot energy subtraction processing" may be carried out wherein the two X-ray images are recorded with a single, simultaneous exposure to X-rays. During the one-shot energy subtraction processing, a beam hardening phenomenon occurs such that a high proportion of the low energy components is absorbed by the front screen 4a, so that the proportion of high energy components is comparatively high in the X-rays which have passed through the front screen 4a. Therefore, the back screen 4b is exposed to more of the high energy components of the X-rays than the front screen 4a. In addition to the effects of the beam hardening phenomenon, the front screen 4a and the back screen 4b have different radiation energy absorption characteristics such that the front screen 4a may absorb the X-rays having a comparatively low energy level, and the back screen 4b may absorb the X-rays having a comparatively high energy level. Therefore, with the one-shot energy subtraction processing, X-ray images can be recorded with X-rays in which the X-ray components have been well separated into high and low energy components. The one-shot energy subtraction processing is disclosed in detail in Japanese Unexamined Patent Publication No. 59(1984)-83147. In this manner, the X-ray images of the object 11 are recorded as latent images on the X-ray film 10. The X-ray film 10 is then developed, and the developed X-ray film is obtained on which the yellow X-ray image is recorded with the X-rays having the low energy level in emulsion layer 3a, and the cyan X-ray image is recorded with the X-rays having the high energy level in emulsion layer 3b.

Instead of having a mere density image like a conventional X-ray image, the X-ray film 10 thus obtained carries the two kinds of images recorded with different radiation energy levels and expressed in different colors. Therefore, when the X-ray film 10 is viewed through, X-ray images can be obtained that contain large amounts of information reflecting the X-ray energy characteristics and are suitable for a diagnosis of the object, or the like.

Thereafter, the X-ray images that have been recorded in different colors on the X-ray film 10, are read out with the radiation image read-out method in accordance with the present invention.

FIG. 6 is a schematic perspective view showing a film digitizer for carrying out an embodiment of the radiation image read-out method in accordance with the present invention.

As illustrated in FIG. 6, a film digitizer 20 is provided with an Ar laser beam source 21 and a He—Ne laser beam source 22. The Ar laser beam source 21 produces a laser beam 23 of a blue color, which is the complementary color of yellow, such that the laser beam may be absorbed by an image developed in a yellow color. The He—Ne laser beam source 22 produces a laser beam 24 of a red color the complementary color of cyan, such that the laser beam may be absorbed by an image developed in a cyan color.

The X-ray film 10, on which the two kinds of the images have been recorded, is placed at a predetermined position in the film digitizer 20. The X-ray film 10 is then conveyed in a sub-scanning direction, which is indicated by the arrow Y, by sheet conveying rollers 26*a* and 26*b*. The sheet conveying rollers 26*a* and 26*b* are driven by a motor (not shown). While the X-ray film 10 is being thus conveyed, the blue laser beam 23 is produced by the Ar laser beam source 21. The blue laser beam 23 is reflected and deflected by a galvanometer mirror 25. In this manner, the blue laser beam 23 is caused to impinge upon the X-ray film 10 and scan it in main scanning directions which are indicated by the double headed arrow X and are approximately normal to the sub-scanning direction. A line sensor 27, which may be constituted of a CCD array, or the like, is located under the X-ray film 10 at the position at which the blue laser beam 23 scans the X-ray film 10 in the main scanning direction. The line sensor 27 extends along the path of the main scanning by the blue laser beam 23. The blue laser beam 23 that has been produced by the Ar laser beam source 21 and scans the X-ray film 10 in the main scanning direction, passes through the X-ray film 10. When the blue laser beam 23 passes through the X-ray film 10, the intensity of the blue laser beam 23 is modulated by the X-ray image that has been recorded with the X-rays having the low energy level and developed in the yellow color on the X-ray film 10. The laser beam 3 that has passed through the X-ray film 10, is received by the line sensor 27. When the laser beam 23 scans the X-ray film 10 along a single main scanning line, an analog signal that represents the image information recorded on the single line along the directions indicated by the double headed arrow X, is obtained from the line sensor 27. The scanning operation is repeated while the X-ray film 10 is being conveyed in the direction indicated by the arrow Y. In this manner, an analog image signal $S_1$ representing the whole area of the X-ray image recorded on the X-ray film 10 with the X-rays having the low energy level is obtained. The analog image signal $S_1$ is then amplified by an amplifier 31 and converted by an A/D converter 32 into a digital image signal $S_{Q1}$. The digital image signal $S_{Q1}$ is fed into a computer system 40.

In the manner described above, the X-ray image recorded on the X-ray film 10 with the X-rays having the low energy level is read out from the X-ray film 10. Thereafter, the X-ray film 10 is again placed at the predetermined position in the film digitizer 20, and the X-ray image recorded on the X-ray film 10 with the X-rays having the high energy level is read out from the X-ray film 10. Specifically, in the same manner as that in the operation for reading out the X-ray image recorded on the X-ray film 10 with the X-rays having the low energy level, the X-ray film 10 is conveyed in the sub-scanning direction indicated by the arrow Y, by the sheet conveying rollers 26*a* and 26*b*. While the X-ray film 10 is being thus conveyed, the red laser beam 24 is produced by the He—Ne laser beam source 22. The red laser beam 24 is reflected and deflected by the galvanometer mirror 25. In this manner, the red laser beam 24 is caused to impinge upon the X-ray film 10 and scan it in the main scanning directions indicated by the double headed arrow X and are approximately perpendicular to the sub-scanning direction. The red laser beam 24 that scans the X-ray film 10 in the main scanning directions, passes through the X-ray film 10. When the red laser beam 24 passes through the X-ray film 10, the intensity of the red laser beam 24 is modulated with the X-ray image that has been recorded with the X-rays having the high energy level and developed in the cyan color on the X-ray film 10. The laser beam 24 having passed through the X-ray film 10, is then received by the line sensor 27. When the laser beam 24 scans the X-ray film 10 along a single main scanning line, an analog signal that represents the image information recorded on the single line along the directions indicated by the double headed arrow X is obtained from the line sensor 27. The scanning operation is repeated while the X-ray film 10 is being conveyed in the direction indicated by the arrow Y. In this manner, an analog image signal $S_2$ representing the whole area of the X-ray image recorded on the X-ray film 10 with X-rays having the high energy level is obtained. The analog image signal $S_2$ is then amplified by the amplifier 31 and converted by the A/D converter 32 into a digital image signal $S_{Q2}$. The digital image signal $S_{Q2}$ is fed into the computer system 40.

The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

The computer system 40 carries out a subtraction process on the image signal $S_{Q1}$, which represents the X-ray image recorded with the X-rays having the low energy level, and the image signal $S_{Q2}$, which represents the X-ray image recorded with the X-rays having the high energy level, both image signals having been obtained from the film digitizer 20. Specifically, the computer system 40 weights the image signals $S_{Q1}$ and $S_{Q2}$, and subtracts the image signal components of the weighted image signals $S_{Q1}$ and $S_{Q2}$ (which image signal components represent corresponding picture elements in the X-ray images) from each other. In this manner, an image signal S is obtained that can be expressed as $$S = A \cdot S_{Q1} - B \cdot S_{Q2} + C \quad (1)$$

wherein A, B, and C each represent a factor. The image signal S represents a bone image, in which the soft tissue patterns of the object 11 have been erased. The values of the factors A, B, and C in Formula (1) may be changed so that a soft tissue image may be obtained, in which the bone patterns have been erased.

In the aforesaid embodiment of the radiation image read-out method in accordance with the present invention, two kinds of laser beam sources are employed in order to carry out the operations for reading the X-ray image recorded with X-rays having the low energy level, and the X-ray image recorded with the X-rays having the high energy level. Alternatively, the X-ray images may be read out by using a white light source that produces white light composed of light having different wavelengths.

Figure 7:
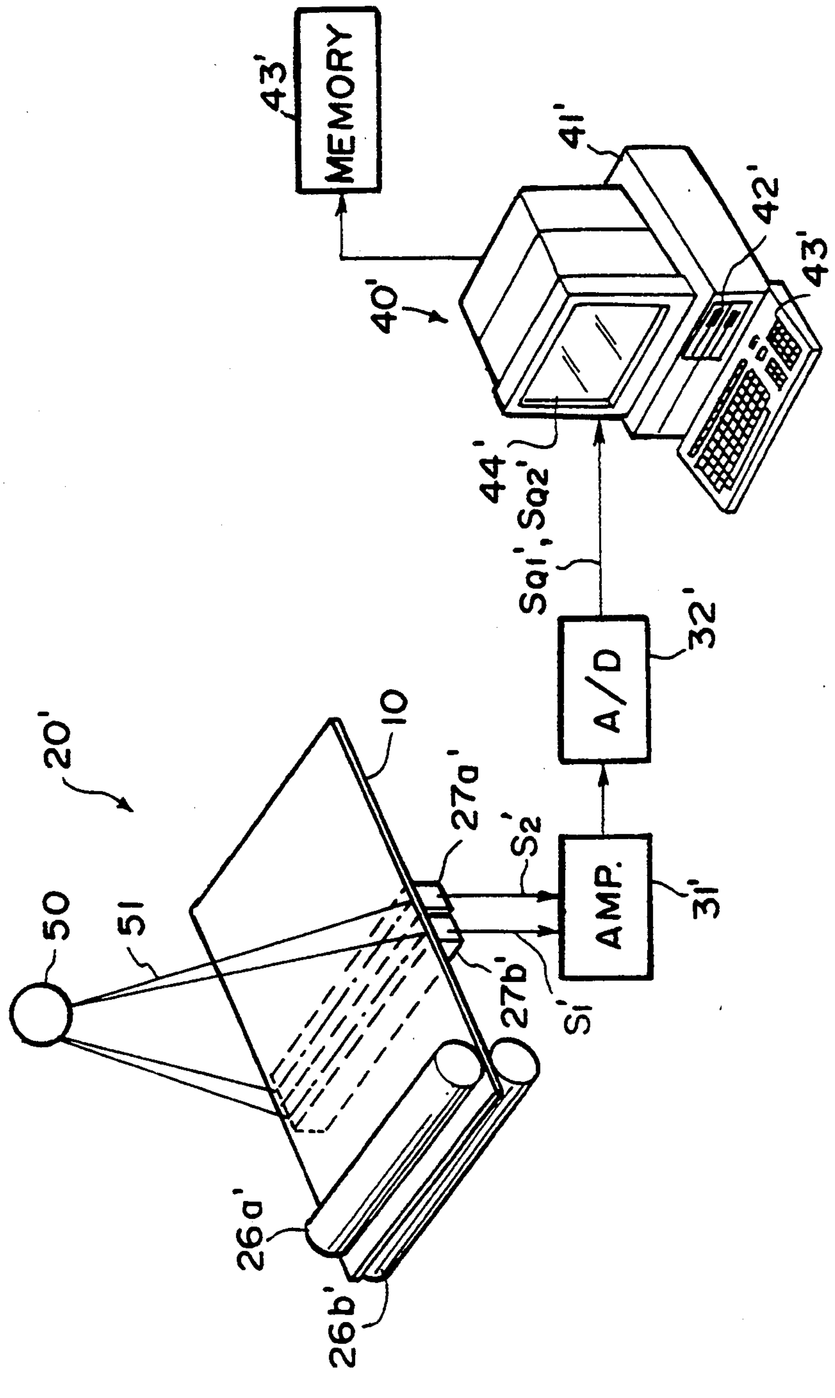
FIG. 7 is a schematic perspective view showing a radiation image read-out apparatus for carrying out a different embodiment of the radiation image read-out method in accordance with the present invention.

Specifically, as illustrated in FIG. 7, in a film digitizer 20', white light 51 is produced by a white light source 50. The white light 51 is irradiated onto the X-ray film 10. A line sensor 27*a'* is provided with a filter that transmits only yellow light contained in the white light 51 having passed through the X-ray film 10. The line sensor 27*a'* detects only the light carrying the image information representing the X-ray image recorded with X-rays having the low energy level. Also, a line sensor 27*b*′ is provided with a filter that transmits only cyan light contained in the white light 51 having passed through the X-ray film 10. The line sensor 27*b*′ detects only the light carrying the image information representing the X-ray image recorded with X-rays having the high energy level. In this manner, the line sensors 27*a*′ and 27*b*′ generate analog image signals respectively representing the X-ray image recorded with X-rays having the low energy level, and the X-ray image recorded with X-rays having the high energy level. In the same manner as that in the film digitizer 20 employed in the aforesaid embodiment of the radiation image read-out method in accordance with the present invention, digital image signals $S_{Q1}'$ and $S_{Q2}'$ are obtained from the analog image signals. Thereafter, a computer system 40 carries out operations for correcting the image signals with respect to a difference between the positions of the line sensors 27*a*′ and 27*b*′. The computer system 40 also carries out the subtraction process. In this manner, the two image signals can be obtained with a single, simultaneous image read-out operation. Also, in such cases, it is unnecessary to carry out adjustment of positions of the X-ray image recorded with X-rays having the low energy level, and the X-ray image recorded with X-rays having the high energy level. In FIG. 7, the elements constituting the film digitizer 20′, which basically equivalent to those constituting the film digitizer 20 shown in FIG. 6, are numbered with corresponding primed reference numerals.

In the aforesaid embodiment of the radiation film in accordance with the present invention, the light blocking layers are located respectively between the substrate and emulsion layers. With the radiation film in accordance with the present invention, cross-over light can be restricted to some extent by the two radiation intensifying screens that have different radiation energy absorption characteristics, and the emulsion layers, each of which has sensitivity corresponding to the emission spectrum of its adjacent radiation intensifying screen. Therefore, the light blocking layers need not necessarily be provided. However, in this embodiment, as illustrated in FIGS. 3 and 4, parts of the emission spectra of the two radiation intensifying screens overlap one upon the other. Therefore, to some extent at least radiation film provided with emulsion layers having sensitivity to approximately identical wavelengths is employed. Accordingly, the light blocking layers should preferably be provided.

Also, in the aforesaid embodiment, the front screen is provided with the phosphor layer constituted of the phosphor represented by the formula $Y_2O_2S$:Tb. Also, the back screen is provided with the phosphor layer constituted of the phosphor represented by the formula $Gd_2O_2S$:Tb. However, no limitation is imposed on the phosphors of the phosphor layers of the radiation intensifying screens, and any other phosphors may be employed. For example, a phosphor producing the fluorescence of the blue region, a phosphor producing the fluorescence of the red region, and the like, may be employed. Additionally, any emulsion layers having sensitivities corresponding to the emission spectra of the which is adjacent radiation intensifying screens may be employed, and can form different colors in the radiation film after the radiation film has been developed.

Figure 8:
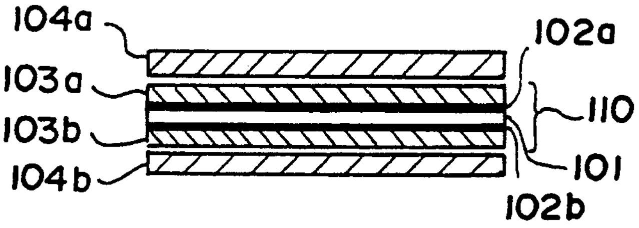
FIG. 8 is a sectional view showing a first embodiment of the screen-film system for energy subtraction processing in accordance with the present invention.

FIG. 8 is a sectional view showing a first embodiment of the screen-film system for energy subtraction processing in accordance with the present invention.

With reference to FIG. 8, an X-ray film 110 comprises a substrate 101, and emulsion layers 103*a* and 103*b* overlaid on opposite surfaces of the substrate 101. Light blocking layers 102*a* and 102*b* intervene between the substrate 101 and emulsion layers 103*a* and 103*b*. The X-ray film 110 is sandwiched between a front screen 104*a* and a back screen 104*b* that serve as X-ray intensifying screens.

The X-ray intensifying screens 104*a* and 104*b* are identical respectively with the radiation intensifying screens 4*a* and 4*b* shown in FIG. 1. The substrate 101 is identical with the substrate 1 shown in FIG. 1. Also, the light blocking layers 102*a* and 102*b* are identical respectively with the light blocking layers 2*a* and 2*b* shown in FIG. 1.

Each of emulsion layers 103*a* and 103*b* is constituted of a binder, such as gelatin, and a silver halide dispersed in the binder. For example, a photographic emulsion layer that has a sensitivity to the blue region, i.e., a regular sensitivity, can be formed by applying a gelatin solution, in which silver iodobromide (AgBrI) grains have been dispersed, onto a substrate and drying it. Also, for example, a photographic emulsion having a sensitivity to the green region, i.e., an orthochromatic sensitivity, and a photographic emulsion having a sensitivity to the red region, i.e., a panchromatic type of emulsion layer, can be formed with a composition containing silver iodobromide grains and a sensitizing dye, such as a green sensitizing dye or a red sensitizing dye absorbed to the silver iodobromide grains.

Figure 9:
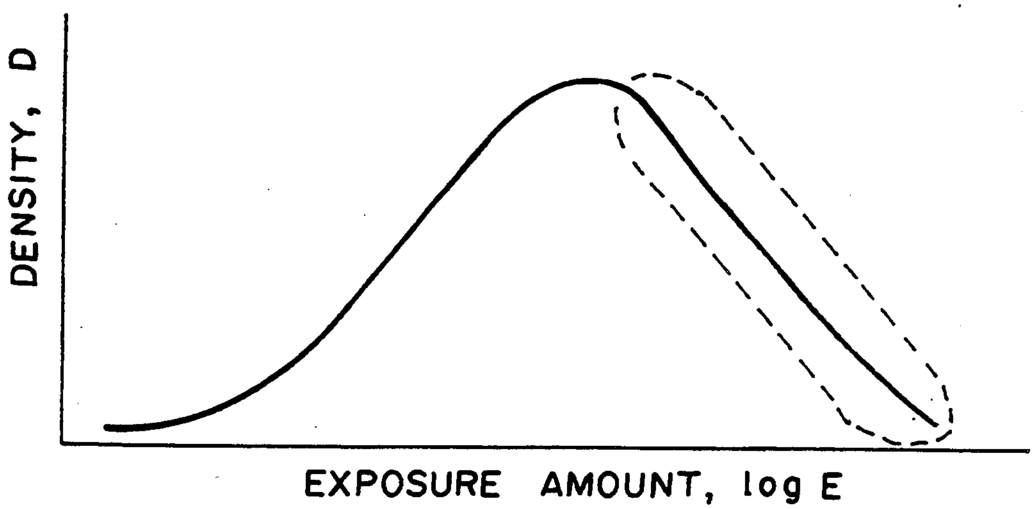
FIG. 9 is a graph showing a solarization region of a duplicating film.

Each of emulsion layers 103*a* and 103*b* of the X-ray film 110 in accordance with the present invention has a sensitivity to the emission spectrum of it's adjacent radiation intensifying screen Emulsion layer 103*b* is a reversal gradation emulsion layer. As the reversal gradation emulsion layer, an emulsion layer having a solarization region (i.e., the part surrounded by the broken line in FIG. 9) can be employed, wherein the density becomes lower when the exposure amount is excessive as in the case of a duplicating film having the characteristics shown in FIG. 9. The front screen 104*a* and the back screen 104*b* are the green (orthochromatic) intensifying screens and respectively have the emission spectra shown in FIGS. 3 and 4. Therefore, emulsion layer 103*a* is constituted of an orthochromatic sensitivity emulsion layer having a sensitivity to the emission spectrum of the front screen 104*a*, which spectrum is shown in FIG. 3. Also, emulsion layer 103*b* is constituted of an orthochromatic sensitivity emulsion layer having a sensitivity to the emission spectrum of the back screen 104*b*, which spectrum is shown in FIG. 4.

How X-ray images of an object are recorded on the X-ray film 110 and an energy subtraction image is obtained from the X-ray images, will be described hereinbelow.

In the same manner as that for the X-ray film 10 shown in FIG. 5, the object 11 having soft tissues and bones is exposed to two kinds of X-rays 13 having different energy levels, both produced by the X-ray source 12, and two kinds of X-ray images are recorded on the X-ray film 110. Specifically, first, the object 11 is exposed to X-rays 13 having a low energy level (e.g., 60 kVp). The X-rays 13 pass through the object 11 and are then absorbed by the front screen 104*a*. The X-rays 13 are thus converted into the fluorescence having the emission spectrum shown in FIG. 3. The fluorescence impinges upon emulsion layer 103*a* of the X-ray film 110 that emulsion layer is which is adjacent to the front screen 104*a*. Thereafter, the tube voltage of the X-ray source 12 is changed, and X-rays having a high energy level (e.g., 120 kVp) irradiate the object 11. As a result, the X-rays 13 pass through the object 11, the front screen 104*a*, emulsion layer 103*a*, the substrate 101, and emulsion layer 103*b*. Thereafter, the X-rays 13 are absorbed by the back screen 104*b* and converted into the fluorescence having the emission spectrum shown in FIG. 4. The fluorescence impinges upon emulsion layer 103*b* which is adjacent to the back screen 104*b*.

As illustrated in FIG. 2, the X-ray energy absorption regions of the front screen 104*a* and the back screen 104*b* are not separated completely from each other. Also, in general, X-rays have a certain width of energy distribution. Therefore, when the X-rays 13 having the low energy level (e.g., 60 kVp) irradiate the object 11, and pass through the front screen 104*a*, a portion is also absorbed by the back screen 104*b*. Also, when the X-rays 13 having the high energy level (e.g., 120 kVp) irradiate the object 11 and pass through the front screen 104*a*, a portion is also absorbed by the front screen 104*a*. As illustrated in FIG. 2, the actual low-energy X-ray absorptivity of the back screen 104*b* is higher than the actual low-energy X-ray absorptivity of the front screen 104*a*. However, as is clear from FIG. 2, when two exposure operations are carried out in the manner described above, the ratio of low energy components to the high energy components in the X-rays 13 absorbed by the front screen 104*a* is higher than the ratio of the low energy components to high energy components in the X-rays 13 absorbed by the back screen 104*b*. Also, the proportion of high energy components in the X-rays 13 absorbed by the back screen 104*b* is higher than the proportion of the high energy components in the X-rays 13 absorbed by the front screen 104*a*. In this manner, by use of the two kinds of the radiation intensifying screens having different radiation energy absorption characteristics, two kinds of X-ray images are formed with different energy characteristics and expressed in different colors on opposite surfaces of a single X-ray film 110.

In the embodiment described above, the X-ray images of the object 11 are recorded on the X-ray film 110 with the two-shot energy subtraction processing. Alternatively, the X-ray images of the object 11 may be recorded with the one-shot energy subtraction processing. In this manner, the X-ray images of the object 11 are recorded as latent images on the X-ray film 110. The X-ray film 110 is then developed, and visible images of the object can thereby be obtained. On the developed X-ray film 110, the X-ray image having the normal gradation is recorded with the X-rays having the low energy level in emulsion layer 103*a*, and the X-ray image having the reversal gradation is recorded with the X-rays having the high energy level in emulsion layer 103*b*.

How the gradation of emulsion layer 103*a* and the gradation of emulsion layer 103*b* are determined such that the images described above may be obtained will be described hereinbelow. As an aid in facilitating the explanation, it is assumed herein that object images are recorded on X-ray film 110 with monochromatic X-rays having low energy level and monochromatic X-rays having high energy level. It is also assumed that the exposure amount of the X-rays having the low energy level during the image recording operation and the exposure amount of the X-rays having the high energy level during the image recording operation are equal to $e^4$. It is additionally assumed that, after the passage through the front side, i.e., through the front screen 104*a* and emulsion layer 103*a*, the exposure amount decreases to $e^{-1}$ times, i.e., the exposure amount on the back side (i.e., the side of the back screen 104*b* and emulsion layer 103*b*) becomes equal to $e^3$. The amount I of the X-rays that impinge upon the X-ray film 110 after the passage through the object is expressed as $$I=I_O\exp(-\mu t) \quad (2)$$

wherein $I_O$ represents the exposure amount before the passage through the object, $\mu$ represents the X-ray absorption coefficient ($cm^{-1}$), and t represents the thickness of the object (cm). Taking logarithms to the base, e, in Formula (2) gives $$\log I/I_O=-\mu t \quad (2)'$$

Therefore, the amount, $I_{front}$, of the X-rays that impinge upon the front side, and the amount, $I_{back}$, of the X-rays that impinge upon the back side, are expressed as $$\log I_{front}=4-\mu_{BL}\cdot t_B-\mu_{TL}\cdot t_T \quad (3)$$

$$\log I_{back}=3-\mu_{BH}\cdot t_B-{}_{TH}\cdot t_T \quad (4)$$

wherein $\mu_{BL}$ represents the absorption coefficient of bones with respect to the X-rays having the low energy level, $\mu_{TL}$ represents the absorption coefficient of soft tissues with respect to the X-rays having the low energy level, $\mu_{BH}$ represents the absorption coefficient of bones with respect to the X-rays having the high energy level, $\mu_{TH}$ represents the absorption coefficient of soft tissues with respect to the X-rays having the high energy level, $t_B$ represents the thickness of the bones, and $t_T$ represents the thickness of the soft tissues.

As an aid in facilitating the explanation, values of $\mu$ are set as $\mu_{BL}=4$
$\mu_{TL}=1$
$\mu_{BH}=1.5$
$\mu_{TH}=0.5$ Table 1 shows the relationship among the values of $\mu$, the amount of the X-rays impinging upon the X-ray film 110, and the values of t.

TABLE 1

| | | | $\mu_{TL}$ 1 | $\mu_{BL}$ 4 | $\mu_{TH}$ 0.5 | $\mu_{BH}$ 1.5 |
|---|---|---|---|---|---|---|
| log I | t(cm) = | 0 | 4 | 4 | 3 | 3 |
| | | 0. 2 | 3.8 | 3.2 | 2.9 | 2.7 |
| | | 0.5 | 3.5 | 2 | 2.75 | 2.25 |
| | | 1 | 3 | 0 | 2.5 | 1.5 |

The gradation of emulsion layer 103*a* and the gradation of emulsion layer 103*b* are determined from the conditions shown in Table 1 and by assuming that the gradation of emulsion layer 103*a* and the gradation of emulsion layer 103*b* change linearly within the X-ray exposure amount region in this embodiment. Emulsion layer 103*a* is the normal gradation emulsion layer, and therefore the gradient takes a positive value. Emulsion layer 103*b* is the reversal gradation emulsion layer, and therefore the gradient takes a negative value. From the ratio of the value of $\mu_{TL}$ to the value of $\mu_{TH}$ in Table 1, the ratio of the gradient of the gradation of emulsion layer 103*a* to the gradient of the gradation of emulsion layer 103*b* is determined as being 2. Specifically, Formula (5) obtains.

$$|\text{Gradient ratio}| = \frac{|\mu_{TL}|}{|\mu_{TH}|} = \frac{1}{1/2} \quad (5)$$

Therefore, the gradation of emulsion layer 103*a* and the gradation of emulsion layer 103*b* are represented by the formulas $$D_A = \tfrac{1}{2}(\log I) \quad (6)$$

$$D_B = -(\log I) + 3 \quad (7)$$

Figure 10:
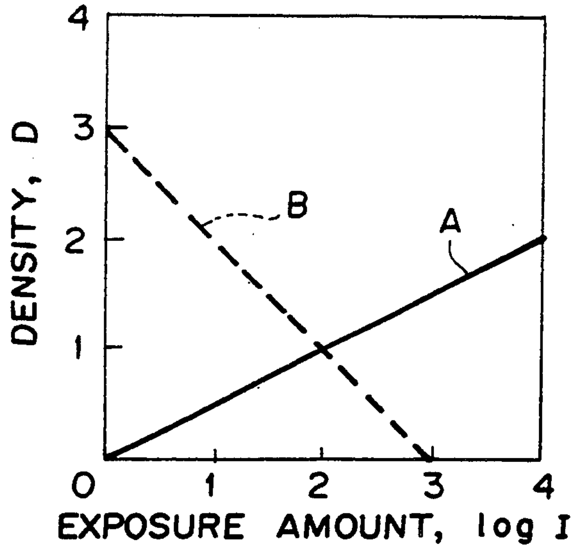
FIG. 10 is a graph showing gradation.

FIG. 10 shows the gradation obtained from Formulas (6) and (7). In FIG. 10, line A and line B correspond respectively to Formula (6) and Formula (7). Table 2 shows the relationship between the density D and the value of t that relationship is found from Formulas (6), (7) and the values of log I obtained in Table 1 .

TABLE 2

| | Density D | | | |
|---|---|---|---|---|
| | $D_{TL}$ | $D_{BL}$ | $D_{TH}$ | $D_{BH}$ |
| t(cm) = 0 | 2 | 2 | 0 | 0 |
| 0.2 | 1.95 | 1.6 | 0.1 | 0.3 |
| 0.5 | 1.75 | 1 | 0.25 | 0.75 |
| 1 | 1.5 | 0 | 0.5 | 1.5 |

In Table 2, $D_{TL}$ represents the density of the soft tissue patterns in the X-ray image recorded with the X-rays having the low energy level, DBL represents the density of the bone patterns in the X-ray image recorded with the X-rays having the low energy level, $D_{TH}$ represents the density of the soft tissue patterns in the X-ray image recorded with the X-rays having the high energy level, and $D_{BM}$ represents the density of the bone patterns in the X-ray image recorded with the X-rays having the high energy level.

After the densities have been determined in the manner described above, an energy subtraction image can be obtained by adding the densities $D_{TL}$ and $D_{TH}$ of the soft tissue patterns together and adding the densities $D_{BL}$ and $D_{BH}$ of the bone patterns together. In this embodiment, both the X-ray image obtained with the X-rays having the low energy level and the X-ray image obtained with the X-rays having the high energy level are recorded on a single X-ray film 110. Therefore, the energy subtraction image can be obtained merely by determining the gradation of emulsion layers of the X-ray film 110 in the manner described above and developing the X-ray film 110. Table 3 shows the relationship among the value of $D_{TL}+D_{TH}$, the value of $D_{BL}+D_{BH}$, and the value of t.

TABLE 3

| | Density D | |
|---|---|---|
| | $D_{TL} + D_{TH}$ | $D_{BL} + D_{BH}$ |
| t(cm) = 0 | 2 | 2 |
| 0.2 | 2 | 1.95 |
| 0.5 | 2 | 1.75 |
| 1 | 2 | 1.5 |

As is clear from Table 3, the X-ray film 110 employed in this embodiment yields an energy subtraction image in which the soft tissue patterns have been erased (i.e., the density of the soft tissue patterns is the same for every thickness) and only the bone patterns are illustrated.

In an embodiment described above, the energy subtraction image is obtained, in which the soft tissue patterns have been erased and only the bone patterns are illustrated. Alternatively, an energy subtraction image may be obtained in which the bone patterns have been erased and only the soft tissue patterns are illustrated. In such cases, emulsion layer 103*a* is constituted of the reversal gradation emulsion layer, emulsion layer 103*b* is constituted of the normal gradation emulsion layer, and X-ray images of the object are recorded on the X-ray film. How the graduations are determined when emulsion layer 103*a* constituted of the reversal gradation emulsion layer and emulsion layer 103*b* is constituted of the normal gradation emulsion layer will be described hereinbelow.

The gradation of emulsion layer 103*a* and the gradation of emulsion layer 103*b* are determined from the conditions shown in Table 1 and by assuming that the gradation of emulsion layer 103*a* and the gradation of emulsion layer 103*b* change linearly as in the aforesaid embodiment. Emulsion layer 103*a* is the reversal gradation emulsion layer, and therefore the gradient takes a negative value. Emulsion layer 103*b* is the normal gradation emulsion layer, and therefore the gradient takes a positive value. From the ratio of the value of $\mu_{BL}$ to the value of $\mu_{BH}$ in Table 1, the ratio of the gradient of the gradation of emulsion layer 103*a* to the gradient of the gradation of emulsion layer b is determined as being 4/1.5. Specifically, Formula (8) obtains.

$$|\text{Gradient ratio}| = \frac{|\mu_{BL}|}{|\mu_{BH}|} = \frac{4}{1.5} = \left(\frac{16/15}{4/10}\right) \quad (8)$$

Therefore, the gradation of emulsion layer 103*a* and the gradation of emulsion layer 103*b* are represented by the formulas $$D_C = -4/10\ (\log I) \quad (9)$$

$$D_D = 16/15\ (\log I) - 1.6 \quad (10)$$

Figure 11:
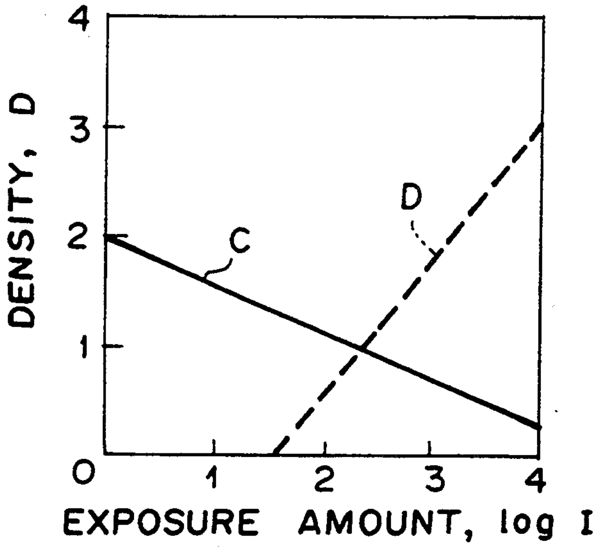
FIG. 11 is a graph showing gradation.

FIG. 11 shows the gradation obtained from Formulas (9) and (10). In FIG. 11, line C and line D correspond respectively to Formula (9) and Formula (10). Table 4 shows the relationship between the density D and the value of t that relationship is found from Formulas (9), (10) and the values of log I obtained in Table 1 .

TABLE 4

| | Density D | | | |
|---|---|---|---|---|
| | $D_{TL}$ | $D_{BL}$ | $D_{TH}$ | $D_{BH}$ |
| t(cm) = 0 | 0.4 | 0.4 | 1.6 | 1.6 |
| 0.2 | 0.48 | 0.72 | 1.439 | 1.28 |
| 0.5 | 0.6 | 1.2 | 1.333 | 0.8 |
| 1 | 0.8 | 2 | 1.067 | 0 |

In the same manner as that in the aforesaid embodiment, after the densities have been determined in the manner described above, the value of $D_{TL}+D_{TH}$ and the value of $D_{BL}+D_{BH}$ are calculated. Table 5 shows the relationship among the value of $D_{TL}+D_{TH}$, the value of $D_{BL}+D_{BH}$, and the value of t.

TABLE 5

| | Density D | |
|---|---|---|
| | $D_{TL} + D_{TH}$ | $D_{BL} + D_{BH}$ |
| t(cm) = 0 | 2 | 2 |
| 0.2 | 1.973 | 2 |
| 0.5 | 1.933 | 2 |

TABLE 5-continued

| | Density D | |
|---|---|---|
| | $D_{TL} + D_{TH}$ | $D_{BL} + D_{BH}$ |
| 1 | 1.867 | 2 |

As is clear from Table 5, an energy subtraction image is obtained in which the bone patterns have been erased (i.e., the density of the bone patterns is the same for every thickness) and only the soft tissue patterns are illustrated.

On the X-ray film provided with emulsion layers having the gradation determined in the manner described above, the object images are recorded with the X-rays having the low energy level and the X-rays having the high energy level. Thereafter, an energy subtraction image can be obtained merely by developing the X-ray film.

Figure 12:
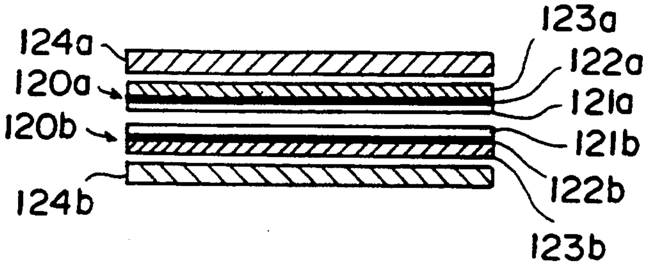
FIG. 12 is a sectional view showing a second embodiment of the screen-film system for energy subtraction processing in accordance with the present invention.

In the aforesaid first embodiment of the screen-film system for energy subtraction processing in accordance with the present invention, two kinds of the images, i.e., an X-ray image obtained with the X-rays having the low energy level and an X-ray image obtained with the X-rays having the high energy level, are recorded on a single X-ray film. Alternatively, screen-film system for energy subtraction processing in accordance with the present invention may be provided with two X-ray films each of which has an emulsion layer on one surface. FIG. 12 is a sectional view showing such a second embodiment of the screen-film system for energy subtraction processing in accordance with the present invention.

With reference to FIG. 12, an X-ray film **120*a* comprises a substrate 121*a*, an emulsion layer 123*a* overlaid on the substrate 121*a*, and a light blocking layer 122*a* intervening therebetween. An X-ray film 120*b* comprises a substrate 121*b*, an emulsion layer 123*b* overlaid on substrate 121*b*, and a light blocking layer 122*b* intervening therebetween. X-ray film 120*a* and X-ray film 120*b* are sandwiched between a front screen 124*a* and a back screen 124*b*. The front screen 124*a* is provided with a 100 mm-thick phosphor layer constituted of a phosphor represented by the formula $Y_2O_2S$:Tb and exhibiting the X-ray energy absorption characteristics indicated by curve A in FIG. 2. The back screen 124*b*** is provided with a 250 μm-thick phosphor layer constituted of a phosphor represented by the formula $Gd_2O_2S$:Tb and exhibiting the X-ray energy absorption characteristics indicated by curve B in FIG. 2.

Emulsion layer **123*a* is identical with emulsion layer 103*a* shown in FIG. 8, and emulsion layer 123*b* is identical with emulsion layer 103*b*shown in FIG. 8. Emulsion layer 123*a* is a reversal gradation emulsion layer of the same type as in the aforesaid embodiment of the screen-film system for energy subtraction processing in accordance with the present invention. Emulsion layer 123*b* is a normal gradation emulsion layer. In the same manner as in the first embodiment of the screen-film system for energy subtraction processing in accordance with the present invention, X-ray images are recorded on the X-ray films 120*a* and 120*b* with X-rays having low energy level and the X-rays having high energy level. In this manner, X-ray film 120*a*, on which an X-ray image has been recorded with the X-rays having the low energy level, and X-ray film 120*b*, on which an X-ray image recorded with the X-rays having the high energy level, are obtained. The X-ray films 120*a* and 120*b* are then developed, and visible images of the object can thereby be obtained. On the developed X-ray film 120*a*, the X-ray image having the reversal gradation is recorded as a visible image with the X-rays having the low energy level. On the developed X-ray film 120*b*, the X-ray image having the normal gradation is recorded as a visible image with the X-rays having the high energy level. The X-ray films 120*a* and 120*b* are then superimposed one upon the other. In such cases, as shown in Table 5, the density of the bone patterns becomes constant regardless of the thickness of the bone patterns, and an energy subtraction image can be obtained in which only the soft tissue patterns are illustrated. In cases where an energy subtraction image is to be obtained in which only the bone patterns are illustrated, emulsion layer 123*a* is a normal gradation emulsion layer, and emulsion layer 123*b*** a reversal gradation emulsion layer as in the aforesaid embodiment of the screen-film system for energy subtraction processing in accordance with the present invention. Also, in such cases, the two developed X-ray films are superimposed one upon the other, and an energy subtraction image can thereby be obtained in which only the bone patterns are illustrated.

In the second embodiment of the screen-film system for energy subtraction processing in accordance with the present invention, emulsion layer overlaid on one of the two X-ray films is a reversal gradation emulsion layer. However, one of the two X-ray films need not necessarily be a reversal gradation emulsion layer. That is, the two X-ray films may be provided with normal gradation emulsion layers, and one of the two X-ray films may be subjected to reversal development. In this manner, the same reversal image can be obtained as in cases where a reversal gradation emulsion layer is developed. Specifically, in cases where an energy subtraction image is to be obtained in which only the soft tissue patterns are illustrated, the X-ray film on which the X-ray image recorded with the X-rays having the low energy level may be subjected to the reversal development. In cases where an energy subtraction image is to be obtained in which only the bone patterns are illustrated, the X-ray film on which the X-ray image recorded with the X-rays having the high energy level may be subjected to the reversal development. In cases where the reversal development is carried out, the radiation exposure amount need not be increased to the solarization region of a reversal gradation duplicating film, or the like, and adverse effects of radiation on a human body, or the like that serves as an object, can thereby be kept small.

In cases where normal gradation emulsion layers are overlaid on opposite surfaces of the substrate of the X-ray film, each of the surfaces of the X-ray film can be independently subjected to a development process by, for example, spraying a developing solution. In this manner, a normal gradation image may be formed on one surface of the X-ray film, and a reversal gradation image may be formed on the other surface of the X-ray film. Also, as illustrated in FIG. 8, in cases where a reversal gradation emulsion layer is overlaid on one surface of the substrate of the X-ray film, and a normal gradation emulsion layer is overlaid on the other surface of the substrate each of the surfaces of the X-ray film can be independently subjected to a development process by, for example, spraying a developing solution. An example, wherein a reversal gradation emulsion layer is overlaid on one surface of a substrate of a radiation film, a normal gradation emulsion layer is overlaid on the other surface of the substrate and both surfaces of the radiation film are simultaneously subjected to a development process using a single developing solution, is disclosed in, Research Disclosure, November 1979, pp. 633–634, No. 18720.

In the aforesaid second embodiment of the screen-film system for energy subtraction processing in accordance with the present invention, in cases where the one-shot energy subtraction processing is carried out, an energy converting panel, such as a Cu plate capable of absorbing more of the X-rays having the low energy level than the X-rays having the high energy level, should preferably be located between the X-ray film 120*a* and the X-ray film 120*b* shown in FIG. 12.

In the aforesaid first and second embodiments of the screen-film system for energy subtraction processing in accordance with the present invention, a light blocking layer removable and has a transmittance of 10% or less is located between each substrate and each emulsion layer. In this manner, cross-over light is restricted to 10% or less. However, such a light blocking layer need not necessarily be provided in cases where cross-over light can be restricted by, for example, combining two radiation intensifying screens that have different radiation energy absorption characteristics, and emulsion layers, each of which has the sensitivity corresponding to the emission spectrum of its adjacent radiation intensifying screen. However, in these embodiments, as illustrated in FIGS. 3 and 4, parts of the emission spectra of the two radiation intensifying screens overlap one upon the other. Therefore, actually, a radiation film is employed which provided with emulsion layers having sensitivity to approximately identical wavelengths. Accordingly, the light blocking layers should preferably be provided.

In the aforesaid first embodiment of the screen-film system for energy subtraction processing in accordance with the present invention, the light blocking layers are located respectively between the substrate and emulsion layers. However, such a light blocking layer may be provided in other ways instead. For example, the substrate itself may be a material having a transmittance of 10% or less. In the second embodiment of the screen-film system for energy subtraction processing in accordance with the present invention, such a light blocking layer may be provided at any position between emulsion layers of the two radiation films superimposed one upon the other. Such a light blocking layer need not necessarily be provided in cases where a Cu plate is located between the two radiation films superimposed one upon the other.

Also, in the aforesaid first and second embodiments of the screen-film system for energy subtraction processing in accordance with the present invention, the front screen is provided with a phosphor layer a constituted of the phosphor represented by the formula $Y_2O_2S$:Tb- Also, the back screen is provided with phosphor layer constituted of the phosphor represented by the formula $Gd_2O_2S$:Tb. However, no limitation is imposed on the phosphors of the phosphor layers of the radiation intensifying screens, and other phosphors may be employed instead. For example, a phosphor producing the fluorescence of the blue region, a phosphor producing the fluorescence of the red region, and the like, may be employed. Additionally, the two radiation intensifying screens have different radiation energy absorption characteristics- However, the two radiation intensifying screens need not necessarily have different radiation energy absorption characteristics and may have the same radiation energy absorption characteristics. Further, any of emulsion layers may be having sensitivities corresponding to the emission spectra of the which is adjacent radiation intensifying screens may be employed.

What is claimed is:

1. A combination of first and second radiation intensifying screens and a radiation film, wherein the radiation film comprises a substrate and first and second emulsion layers, the first and second emulsion layers overlie opposite surfaces of the substrate, the radiation film is sandwiched between the first and second radiation intensifying screens, the first and second radiation intensifying screens have different radiation energy absorption characteristics from each other, the first emulsion layer has a sensitivity corresponding to a first emission spectrum of the first radiation intensifying screen, the second emulsion layer has a sensitivity corresponding to a second emission spectrum of the second radiation intensifying screen, the first and second emulsion layers form different colors in said radiation film after the radiation film has been developed, and a light blocking layer is located between the first and second emulsion layers and can be made transparent without moving the first and second emulsion layers relative to each other.

2. A screen-film system for energy subtraction processing comprising a front radiation intensifying screen, a back radiation intensifying screen, and a radiation film comprising a substrate and first and second emulsion layers that overlie opposite surfaces of the substrate, such that the radiation film is sandwiched between the front and back radiation intensifying screens, wherein the first emulsion layer is a normal gradation emulsion layer, and the second emulsion layer is a reversal gradation emulsion layer, the front radiation intensifying screen comprises a first phosphor having a first radiation energy absorption ratio and the second radiation intensifying screen comprises a second phosphor having a second radiation energy absorption ratio, the radiation energy absorption ratio of an object being defined as the object's coefficient of radiation absorption when exposed to radiation of a first wavelength, divided by the object's coefficient of radiation absorption when exposed to radiation of a second wavelength, the first wavelength being longer than the second wavelength, the first radiation energy absorption ratio is higher than the second radiation energy absorption ratio, and a light blocking layer is located between the first and second emulsion layers and can be made transparent without moving the first and second emulsions relative to each other.

3. A screen-film system for energy subtraction processing comprising a front radiation intensifying screen, a back radiation intensifying screen, respectively, and two radiation films superposed one upon the other and sandwiched between the front and back radiation intensifying screens, wherein a first emulsion layer overlies one of said two radiation films and is a normal gradation emulsion layer, and a second emulsion layer overlies the other of said two radiation films, and is a reversal gradation emulsion layer, the front radiation intensifying screen comprises a first phosphor having a first radiation energy absorption ratio and the second radiation intensifying screen comprises a second phosphor having a second radiation energy absorption ratio, the radiation energy absorption ratio of an object being defined as the object's coefficient of radiation absorption when exposed to radiation of a first wavelength, divided by the object's coefficient of radiation absorption when exposed to radiation of a second wavelength, the first wavelength being longer than the second wavelength, the first radiation energy absorption ratio is higher than the second radiation energy absorption ratio, and a light blocking layer is located between the first and second emulsion layers and can be made transparent without moving the first and second emulsion layers relative to each other.

4. A screen-film system for energy subtraction processing as defined in claim 3 wherein an energy converting panel is located between said two radiation films, such that radiation having a first ratio of low energy X-rays to high energy X-rays before passing through the energy converting panel has second ratio of low energy X-rays to high energy X-rays after having passed through the energy converting panel, the first ratio differing from the second ratio.

5. A screen-film system for energy subtraction processing as defined in claim 3, wherein an energy converting panel is located between said two radiation films, such that radiation having a first ratio of low energy X-rays to high energy X-rays before passing through the energy converting panel has second ratio of low energy X-rays to high energy X-rays after having passed through the energy converting panel, the first ratio differing from the second ratio.

6. A screen-film system for energy subtraction processing comprising a front radiation intensifying screen, a back radiation intensifying screen, respectively, and two radiation films superposed one upon the other and sandwiched between the front and back radiation intensifying screens, wherein a first emulsion layer overlies one of the two radiation films and is a normal gradation emulsion layer, and a second emulsion layer overlies the other of the two radiation films, and is a reversal gradation emulsion layer, wherein a light blocking layer is located between the first and second emulsion layers and can be made transparent without moving the first and second emulsion layers relative to each other, and wherein an energy converting panel is located between the two radiation films, such that radiation having a first ratio of low energy X-rays to high energy X-rays before passing through the energy converting panel has second ratio of low energy X-rays to high energy X-rays after having passed through the energy converting panel, the first ratio differing from the second ratio.

7. A screen-film system for energy subtraction processing as defined in any of the previous claims, wherein said first and second emulsion layers have gradation changing approximately linearly within an anticipated range of radiation exposure amount.

8. An energy subtraction processing method comprising the steps of:

a) exposing to radiation a screen-film system for energy subtraction processing, the screen-film system for energy subtraction processing comprising first and second radiation films superimposed one upon the other and sandwiched between front and back radiation intensifying screens, a light blocking layer that can be made transparent, and radiation images of an object being thereby recorded as latent images on the first and second radiation films;

b) carrying out a normal development on the first radiation film;

c) carrying out a reversal development on the second radiation film; and d) superimposing the first and second radiation films one upon the other.

* * * * *